US009918190B2

(12) United States Patent
Bourque et al.

(10) Patent No.: US 9,918,190 B2
(45) Date of Patent: Mar. 13, 2018

(54) AUGMENTING NETWORK DEVICE MANAGEMENT

(71) Applicant: Cisco Technology, Inc., San Jose, CA (US)

(72) Inventors: Daniel Bourque, Fremont, CA (US); Joel Obstfeld, England (GB); Ed Kern, San Jose, CA (US); Anoosh Hosseini, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 310 days.

(21) Appl. No.: 14/625,406

(22) Filed: Feb. 18, 2015

(65) Prior Publication Data

US 2016/0241996 A1 Aug. 18, 2016

(51) Int. Cl.
 *G06F 15/16* (2006.01)
 *H04W 4/02* (2018.01)
 (Continued)

(52) U.S. Cl.
 CPC ............ *H04W 4/021* (2013.01); *H04L 29/06* (2013.01); *H04L 41/145* (2013.01); *H04L 43/045* (2013.01); *H04L 67/12* (2013.01); *H04L 67/18* (2013.01); *H04L 67/22* (2013.01); *H04L 69/08* (2013.01); *G06Q 10/06* (2013.01); *H04W 64/00* (2013.01)

(58) Field of Classification Search
 CPC .... H04L 29/08082; H04L 29/06; G06Q 10/06
 USPC .......... 709/203, 220, 224, 227, 228
 See application file for complete search history.

(56) References Cited

U.S. PATENT DOCUMENTS 8,705,707 B1\* 4/2014 Schilit ...................... 379/201.07
8,725,794 B2\* 5/2014 Kandasamy ........... G06Q 30/02
 709/203

(Continued)

*Primary Examiner* — Khanh Dinh
(74) *Attorney, Agent, or Firm* — Hickman Palermo Becker Bingham LLP (57) ABSTRACT

In an embodiment, presenting computer datacenter information comprises a server computer system that is coupled to a plurality of internetworking devices. The plurality of internetworking devices is configured to emit device location information. The server computer system receives the device location information from one or more internetworking devices, where the device location information is based on a particular proximity to a mobile computing device. The server computer system determines a geo-location and proximity of the mobile computing device relative to the one or more internetworking devices. The server computer system then selects device related information for a particular internetworking device, of the one or more internetworking devices, that has closest proximity to the determined geo-location of the mobile computing device. The server computer system then modifies a level of detail of the device related information based upon proximity of the mobile computing device and the particular internetworking device. The server computer system presents the device related information for the particular internetworking device, to the mobile computing device. In other embodiments, the invention encompasses a computer-readable medium configured to carry out the foregoing steps.

18 Claims, 4 Drawing Sheets

(51) Int. Cl.
*H04L 29/08* (2006.01)
*H04L 12/24* (2006.01)
*H04L 12/26* (2006.01)
*H04L 29/06* (2006.01)
*H04W 64/00* (2009.01)
*G06Q 10/06* (2012.01)

(56) References Cited

U.S. PATENT DOCUMENTS

| | | | | |
|---|---|---|---|---|
| 9,071,928 B2* | 6/2015 | Ward | ............ | H04W 4/02 |
| 9,197,994 B2* | 11/2015 | Bohorquez | ............ | H04W 4/021 |
| 9,210,225 B2* | 12/2015 | Kadakia | ............ | H04L 65/1073 |
| 9,216,225 B2* | 12/2015 | Rogers | ............ | A61K 47/48084 |
| 9,288,626 B2* | 3/2016 | Lancaster | ............ | H04W 4/025 |
| 9,503,370 B2* | 11/2016 | Wainner | ............ | H04L 45/742 |
| 2013/0107752 A1* | 5/2013 | Kadakia | ............ | H04L 65/1073 |
| | | | | 370/254 |
| 2014/0222462 A1* | 8/2014 | Shakil | ............ | G06Q 50/22 |
| | | | | 705/3 |
| 2015/0146722 A1* | 5/2015 | Wainner | ............ | H04L 45/742 |
| | | | | 370/392 |

* cited by examiner

AUGMENTING NETWORK DEVICE MANAGEMENT

TECHNICAL FIELD

The present disclosure generally relates to computer-implemented techniques that improve the efficiency and speed with which device management data relating to internetworking devices such as switches and routers may be presented to mobile computing devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Datacenter management encompasses monitoring and support of datacenter performance, inventory management, network access, and ensuring network traffic is efficiently flowing. Datacenters may include internetworking devices such as routers, switches, and firewalls, as well as service devices such as application servers, storage servers, server consoles, network cables, and power cables. Inventory management may include monitoring device capacity, device health, such as the power and temperature levels of a particular server, as well as ensuring that data traffic is efficiently flowing from one point to another. Performance management may include monitoring latency thresholds, packet throughput, and response times.

As part of datacenter management, field engineers have access to discrete data repositories to troubleshoot datacenter issues. Network topology maps are used to keep an inventory of where devices are located within the datacenter. Topology maps along with access to data repositories are used to troubleshoot and repair faults within the datacenter. However, a challenge of datacenter management involves how to rapidly obtain network management data, such as flow statistics, from a particular network device of interest. Datacenters often are constructed using densely configured racks of routers, switches, and other computers, so finding a device of interest and obtaining network management data just from that device can be a considerable challenge in a large, dense datacenter.

DESCRIPTION OF EXAMPLE EMBODIMENTS

Computer-implemented techniques that improve the efficiency and speed with which device management data relating to internetworking devices such as switches and routers may be presented to mobile computing devices, including augmenting network device management, is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
    1.0 General Overview
    2.0 Structural Overview
    3.0 Functional Description
        3.1 Device Location Information
        3.2 Presenting device related information to a mobile computing device
        3.3 Generating and updating the device location data model of the datacenter
    4.0 Implementation Mechanisms—Hardware Overview
    5.0 Extensions and Alternatives
    1.0 General Overview In an embodiment, presenting computer datacenter information uses a server computer system that is coupled to a plurality of internetworking devices. The plurality of internetworking devices is configured to emit device location information. The server computer system receives the device location information from one or more internetworking devices, where the device location information is based on a particular proximity to a mobile computing device. The server computer system determines a geo-location and proximity of the mobile computing device relative to the one or more internetworking devices. The server computer system then selects device related information for a particular internetworking device, of the one or more internetworking devices, that has closest proximity to the determined geo-location of the mobile computing device. The server computer system then modifies a level of detail of the device related information based upon proximity of the mobile computing device and the particular internetworking device. The server computer system presents the device related information for the particular internetworking device, to the mobile computing device. In other embodiments, the invention encompasses a computer-readable medium configured to carry out the foregoing steps.

With the growing need for greater interconnectivity, datacenters are becoming more and more complex. Datacenters typically are equipped with several internetworking devices such as different types of routers, switches, firewalls, and other communication devices. With the growing complexity of network traffic and the growing number of internetworking devices, efficient management of datacenters becomes ever more important.

In troubleshooting a network issue, field technicians may be required to access different types of device related information from different sources. The different sources may include, but are not limited to, different database repositories where information related to the devices are kept. For instance, a database repository may contain device specification information including installed firmware information. Another database repository may contain diagnostic history including network errors related to each device. Yet another database repository may contain current levels of internet traffic flow through each device. Being able to access device related information from different sources may involve manually accessing each database repository to troubleshoot network issues. After determining possible network issues, field technicians may then have to locate the particular device within the datacenter. These steps for troubleshooting device issues may become challenging and inefficient.

In an embodiment, a solution for efficient datacenter management involves mapping internetworking devices into a data model of a datacenter. The data model represents devices in the datacenter in terms of type, features, configuration, interfaces, and the like. Device related information is presented to a mobile computing device, based on a geo-location of the mobile computing device relative to the mapped internetworking devices nearby. The device related information may include aggregating information from various database repositories in order to present information related to each nearby internetworking device displayed on the mobile computing device used by the field technician. The level of detail of the device related information depends on the proximal distance between the mobile computing device and the particular internetworking device. The geo-location of the mobile computing device may be determined by the mobile computing device scanning or detecting a tag or marker on a nearest internetworking device, such as an RFID tag, QR code, barcode or other symbol. Additionally, an absolute location of the mobile computing device may be determined by receiving signals from the mobile computing device via cellular radio connection, WiFi radio connection, Bluetooth radio connection, and the like.

2.0 Structural Overview

In an embodiment, to present device related information for a specific internetworking device to a mobile computing device based on proximity of the mobile computing device to the internetworking device, a physical location for each internetworking device may be mapped onto a map of the datacenter floor. Physical location may be absolute, such as a pair of latitude-longitude values obtained from precise GPS mapping of the location of the specific internetworking device. Physical location also may be relative; for example, a pair of absolute latitude-longitude values obtained from precise GPS mapping of the location of a room of the datacenter, and then a physical rack location of the internetworking device may be manually measured and the measurements may be stored as offsets from the latitude-longitude values. The physical location may be stored in a device repository that is used to manage the location of different internetworking devices and associated data repository identifiers used in various other data repositories. In an embodiment the device repository may include a database that stores location information and data repository identifiers for each internetworking device. The result may be a device repository that has latitude-longitude values, or lat-long values plus offset values, for every internetworking device in a datacenter, stored in association with identifying information such as MAC address, device number, device name, or other information that is unique to a device.

In an embodiment, a datacenter management computer system is used to provide device related information to a mobile computing device used by a user, such as a field technician, based upon a comparative location of the mobile computing device in relation to locations of internetworking devices within the datacenter. The datacenter management computer system maintains a device location data model of the mapped internetworking devices and associated information related to each internetworking device. The device location data model is a topology repository that receives internetworking device related information from various other repositories and maintains the related information in one or more electronic records that may be viewed as living documents. The size and structure of the one or more living documents may vary based upon the complexity and detail configured. The device location data model may be implemented using standards such as Content Management Interoperability Services (CMIS) to send and consume data messages that update the internetworking device related information within the device location data model. CMIS is a standard that provides a uniform means for an application to communicate with various data repositories. The data repositories may include, but are not limited to, standard databases, messaging services, and other applications using some form of data communication. Embodiments of the device location data model are not limited to implementing CMIS, other embodiments may use any framework designed communicate with multiple data repositories.

In one embodiment, the techniques herein make it possible for an individual having a mobile computing device to enter a densely racked datacenter, approach an internetworking device of interest, and promptly receive configuration, status and flow information for that particular internetworking device of interest using the mobile computing device without having to enter device information but strictly based upon proximity. In one specific embodiment, the mobile computing device comprises an augmented reality device such as wearable glasses with an integrated computer. In this embodiment, it is possible with the techniques herein for an individual to enter a datacenter, walk up to a device of interest, and promptly receive a display of device-related information in the augmented reality display of the wearable glasses. Further, it is possible for an individual to approach a rack of multiple internetworking devices and promptly receive a display of device-related information for that particular internetworking device that is then presently the closest device to the individual's mobile computing device.

Figure 1:
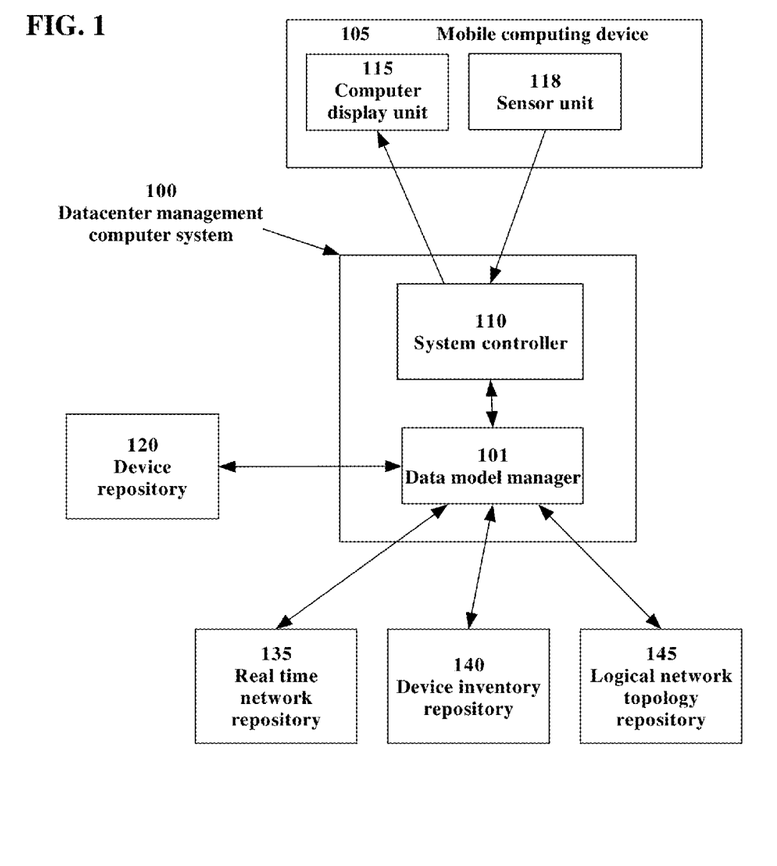
FIG. 1 illustrates an embodiment of a datacenter management computer system.

FIG. 1 depicts an embodiment of an example datacenter management computer system, multiple data repositories, and a connected mobile computing device. In an embodiment, a datacenter management computer system 100 may host, execute or include a data model manager 101 and a system controller 110. The data model manager 101 may be configured or programmed to maintain a device location data model, including sending and receiving updates of device related information. The system controller 110 may be configured or programmed to create device location data model queries for device related information and to send device related information to a related mobile device. Embodiments of the datacenter management computer system 100 may include, but are not limited to, one or more server computers running the data model manager 101 and one or more instances of the system controller 110. In other words, for purposes of illustrating a clear example, FIG. 1 shows single instances of particular functional units as described above, but other embodiments may use any number of particular functional units and single instances are not required.

In FIG. 1 the datacenter management computer system 100 is connected to multiple data repositories including a device repository 120. The device repository 120 may store datacenter location information and associated device identifiers. In an embodiment, the device repository 120 may use a CMIS interface to communicate internetworking device location and identifier information to the data model manager 101.

In an embodiment, the data model manager 101 initially populates the device location data model by requesting internetworking device location information from the device repository 120. Populating the data model also may include automatic device discovery operations using, for example, Cisco Discovery Protocol (CDP) or other discovery protocols to initially identify what devices are present in the datacenter and to establish initial identifying or inventory records for those devices. Or, initial identifying or inventory information may be configured by an administrator and the processes herein may be used only to find location data. Internetworking device data may include, but is not limited to, geo-location data as well as all associated internetworking device identifiers used in other data repositories.

Once the internetworking devices and their associated geo-location data are loaded into the device location data model, the data model manager 101 may receive and load, into the device location data model, associated data from other data repositories. In an embodiment, other data repositories may use a CMIS compliant data messaging service to produce and send data to the data model manager 101. Examples of the other data repositories may include, but are not limited to, device inventory and network topology information, messaging services updating state information, and alert services configured to notify when triggered alerts occur. In the embodiment depicted in FIG. 1 the following data repositories are displayed: a real time network repository 135, device inventory repository 140, and a logical network topology repository 145.

The real time network repository 135, for instance, may send data or status information for real time network traffic that is currently interacting with a particular internetworking device. The real time network repository 135 may store real time data packets that are sent and received by the particular internetworking device. The real time network repository 135 may then send the real time data, using a data messaging service, to the data model manager 101. The data model manager 101 may then update the device location data model to reflect the latest data packets that have interacted with the particular internetworking device.

In an embodiment, the device inventory repository 140 may update the data model manager 101 when device inventory data changes. For example, if a technician installs a new power unit for a rack, then the device inventory repository 140 may send a message to the data model manager 101 to update the current inventory of spare rack power units within the device location data model.

In an embodiment, the logical network topology repository 145 may store information related to the logical interconnectivity between devices and the particular internetworking device in question. In an embodiment, the data model manager 101 may use the data from the logical network topology repository 145 to create a network connectivity layer that outlines the connections between internetworking devices. In an embodiment, if a particular router is disconnected from other devices then the logical network topology repository 145 will reflect the change to the network topology and may send updated topology information to the data model manager 101.

In an embodiment, the system controller 110 sends internetworking device related information requests to the data model manager 101. The internetworking device related information requests are requests for information regarding the internetworking devices that are within a certain proximity to a mobile computing device 105. The system controller 110 determines the location of the mobile computing device 105 based upon the proximity to nearby internetworking devices.

In an embodiment, the mobile computing device 105 may be augmented reality glasses that are able to accurately track the location and spatial movement of the glasses as well as render fully stereoscopic images in a miniature computer display device that is positioned within the user's field of view when the glasses are worn. Embodiments of the mobile computing device 105 may include, but are not limited to: wearable augmented reality glasses such as Technical Illusions castAR glasses, Meta Spaceglasses, and Google Glass or successor devices; smart phones or tablets that are equipped with a camera; or other mobile computing devices equipped with a camera, a display screen, and a sensor unit. The mobile computing device 105 includes a computer display unit 115 and a sensor unit 118. The computer display unit 115 is used to display the stereoscopic images of internetworking device related information received onto the user's field of view. Further details on how the computer display unit 115 presents internetworking device related information are discussed in detail in section 3.2 of this description. The sensor unit 118 detects nearby internetworking devices by receiving emitted signals from the nearby internetworking devices. The sensor unit 118 may be configured to determine, from the one or more emitted signals, a spatial location and proximity of the mobile computing device 105 in relation to each internetworking device that is emitting a signal.

In an embodiment, signal emitters may be affixed to internetworking devices for the purpose of emitting internetworking device identification information. In an embodiment, the signal emitted from each internetworking device may include a unique device identifier. Further details on how the internetworking devices emit information to the mobile computing device 105 are discussed in detail in section 3.1 of this description. In an embodiment, signal emitters may also be affixed to parts of the datacenter itself, such as racks, rack locations or shelves, walls, poles, or pillars for the purpose of further determining the spatial location of the mobile computing device 105 within the datacenter.

In an embodiment, the system controller 110 sends and receives data to and from the data model manager 101. The system controller 110 receives device location information sensed from the sensor unit 118 of the mobile computing device 105 for location determination. In an embodiment, the device location information includes internetworking device identifiers and their corresponding spatial location information. The system controller 110 determines, from the device location information, what internetworking device related information to request from the data model manager 101. For example, when the user of the mobile computing device 105 is standing directly in front of a particular switch the sensor unit 118 may determine, based on the emitted signal from the particular switch that the mobile computing device 105 is directly in front of the user. Then the sensor unit 118 sends device location information, which includes the device identifier for the particular switch and spatial location information, to the system controller 110. The system controller 110 then determines that device related information for the particular switch is needed. The system controller 110 sends a request for information to the data model manager 101. The data model manager 101 sends information such as IP address, lines highlighting direct connections to other devices, and highlighting specific ports that may be currently receiving network traffic to the system controller 110. The system controller 110 then sends the received interworking device related information to the computer display unit 115 of the mobile computing device 105.

In an embodiment, when data in the device location data model is updated, the data model manager 101 may alert the system controller 110 that one or more mobile computing devices may require updated internetworking device related information. If the data model manager 101 alerts the system controller 110 of a data update, then the system controller 110 may request the updated information from the data model manager 101. Upon receiving the updated information the system controller 110 may push the updated data to the computer display unit 115 of the mobile computing device 105. For example, if a particular router is no longer receiving real time data packets then the real time network repository 135 may send updated real time data packet information to the data model manager 101. The data model manager 101 may then update the current device location data model to reflect that no real time data packets are being received by the particular router. The data model manager 101 may then alert the system controller 110 of the update. The system controller will then determine whether the mobile computing device 105 is within a particular proximity to the particular router, based upon the last known location of the mobile computing device 105. If the mobile computing device 105 were within the particular proximity to the particular router, then the system controller 110 would request updated real time packet information and send updated real time packet information to the computer display unit 115 of the mobile computing device 105. Then the user of the mobile computing device 105, such as the technician, would see the updated real time packet information as it happens in his field of view.

3.0 Functional Description

Figure 2:
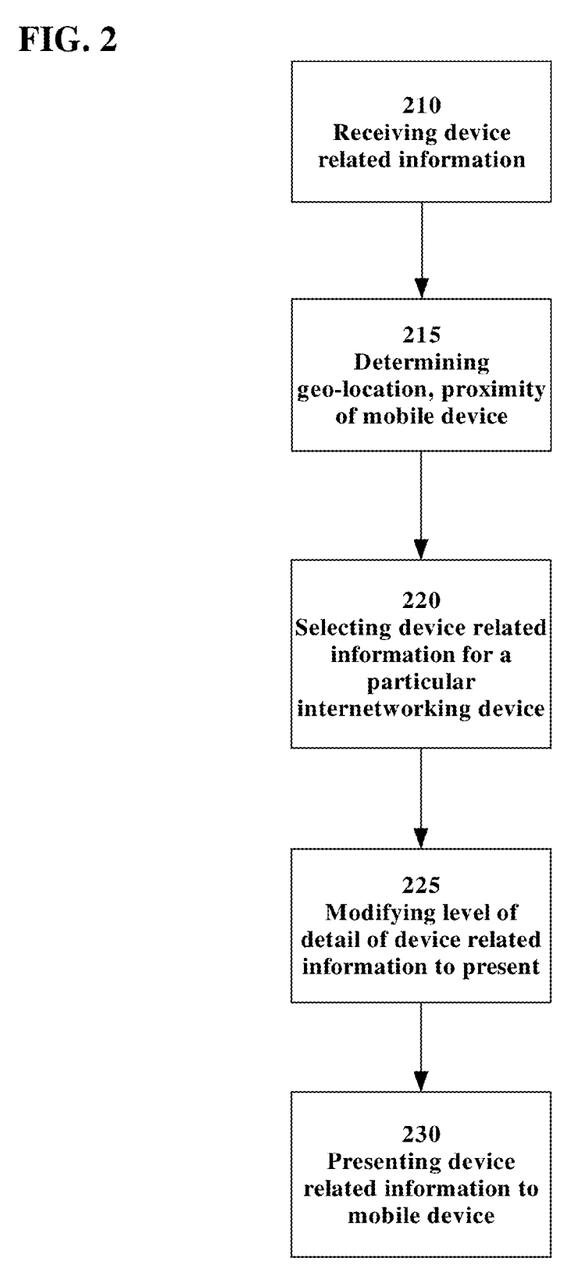
FIG. 2 illustrates a computer-implemented process for receiving internetworking device information, determining a geo-location for a mobile computing device, presenting and modifying internetworking device related information.

FIG. 2 is a flow diagram that depicts a process for presenting device related information to a mobile computing device. For purposes of illustrating a clear example, FIG. 2 is described in connection with certain elements of FIG. 1. However, other embodiments of FIG. 2 may be practiced in many other contexts and references herein to units of FIG. 1 are merely examples that are not intended to limit the broader scope of FIG. 2.

Block 210 specifies that the process is configured for receiving device related information. For example, at block 210 the system controller 110 receives device location information from the mobile computing device 105. In an embodiment, the mobile computing device 105 may send device location information for one or more internetworking devices. Block 215 specifies determining geo-location, proximity of mobile device. For example, block 215 the system controller 110 uses the proximity measurements of the respective one or more internetworking devices to determine the geo-location of the mobile computing device 105.

Block 220 specifies selecting device related information for a particular internetworking device. For example, block 220, the system controller 110 selects the device related information for a particular internetworking device that has closest proximity to the mobile computing device 105. Proximity determination may include, but is not limited to, using the physical proximity from the mobile computing device 105 to the particular internetworking device, and the angle in which the mobile computing device 105 is facing the particular internetworking device. For instance, if the closest physical proximity is between the mobile computing device 105 and a particular router, but the mobile computing device was facing away from the particular router, then the particular router would not be the internetworking device selected because the particular router is not within the field of view of the mobile computing device 105. In this case, the system controller 110 would select the next closest internetworking device that is within the field of view of the mobile computing device 105 and request device related information from the data model manager 101.

Block 225 specifies modifying a level of detail of device related information to present. For example, block 225, the system controller 110 modifies the level of detail to communicate to the mobile computing device 105 based upon the proximity of the mobile computing device 105 to the particular internetworking device. For example, if the mobile computing device 105 is at a far distance from a particular internetworking device, such as a router, then the system controller 110 may communicate only the IP address of the router. As the mobile computing device 105 moves closer to the router, the system controller 110 may modify the level of detail, based upon proximity, so as to show physical and logical connections with other devices. The purpose for modifying the level of detail is to ensure that the level of detail, when presented, to the mobile computing device 105 is proportional to the displayable field of view of the user of the mobile computing device 105. By adjusting the level of detail of the device related information the mobile computing device 105 may efficiently display the device related information and ensure the accuracy of the superimposed device related information.

Block 230 specifies presenting device-related information to a mobile computing device. For example, at block 230, the system controller 110 presents device related information, for the particular internetworking device that has closest proximity, to the mobile computing device 105. In an embodiment, presenting device related information includes, but is not limited to, physical connections to the particular internetworking device, logical connections associated with the particular device, and real time data throughput between the particular device and other devices connected to it. For example, if the particular internetworking device is a switch, then the device related information presented to the user may include: physical connections to the switch such as cable routing to routers; logical connections showing the connections to endpoint servers; and real time data packets showing particular data packet destinations addresses.

3.1 Device Location Information

In an embodiment, internetworking devices may utilize an interior positioning system, such as Infrared (IR) location, to determine the position of the mobile computing device 105 relative to the internetworking devices. IR interior positioning systems may be implemented using wireless devices and line-of-sight communication between transmitters and receivers to determine positioning of a given receiver. The physical position of each internetworking device may be mapped into the device location data model. Each internetworking device includes an IR transmitter that emits a modulated IR signal containing a unique device identifier. The emitted IR signal may be used to determine whether the mobile computing device 105 is within a particular range of that internetworking device. The IR transmitter may also emit two or more signals that are used to determine the relative position of the mobile computing device 105 within the particular range.

In one embodiment, the sensor unit 118 of the mobile computing device 105 includes an IR receiver that scans the emitted IR signals from nearby internetworking devices. The IR receiver captures the unique device identifier from the modulated IR signal and uses the other two or more emitted signals to determine the relative position in 3-dimensional space and the proximity between the internetworking device and the mobile computing device 105. The sensor unit 118 then sends the unique device identifier associated with a particular internetworking device and proximity information to the system controller 110. The system controller 110 determines the location of the mobile computing device 105 relative to the internetworking devices scanned. The system controller 110 is able to further approximate the current location of the mobile computing device 105 when the sensor unit 118 scans multiple internetworking devices using triangulation techniques.

In an embodiment, the sensor unit 118 is constantly scanning for emitted IR signals as the user of the mobile computing device 105 moves through the data center. When the sensor unit 118 receives a new signal or receives updated spatial location and orientation information, the sensor unit 118 sends the new or updated information to the system controller 110. The system controller 110 determines whether a new device location data model request for information is required. The system controller 110 may also determine whether to change the amount of detail of information sent to the computer display unit 115 for a particular internetworking device. For instance, if the user of a mobile computing device 105 is standing 10 feet from a particular router, then the system controller 110 may determine that only a minimal amount of information related to the particular router should be sent to the computer display unit 115 of the mobile computing device 105. As the user of the mobile computing device 105 walks closer to the particular router, the sensor unit 118 may update the system controller 110 of the changing proximity to the particular router. The system controller 110 may then in turn, request more detailed information from the data model manager 101 and send the more detailed information to the computer display unit 115 of the mobile computing device 105.

In another example, if the user of the mobile computing device 105 turns his head or body away from the particular router, the sensor unit 118 may update the system controller 110 of the new orientation of the mobile computing device 105. If the system controller 110 determines that the particular router that was once directly in front of the mobile computing device 105 is now in the periphery of the user's field of view, then the system controller 110 may only request only a minimal amount of data from the data model manager 101.

In an embodiment, the level of detail of the interior positioning system may depend on the number of IR emitters deployed within the datacenter. For instance, if multiple routers within a rack emit their own IR signal then the system controller 110 may be able to track the location of the mobile computing device 105 within the datacenter floor plan (x and z axis) as well as height of the mobile computing device 105 (y axis) relative to the height of the routers within the rack. By having the ability to track the mobile computing device 105 on all three axes, the system controller 110 is able to differentiate between when a user angles the mobile computing device 105 to one particular router over another within a rack.

In another embodiment, internetworking devices may utilize Active Radio Frequency Identification (RFID) as an interior positioning system to determine the position of the mobile computing device 105. RFID systems determine position based on presence of an object in a particular area, within the range of an RFID scanner. Each internetworking device, mapped in the device location data model, includes an RFID tag that contains an electronic code which conveys a unique device identifier for each particular internetworking device. The sensor unit 118 is a RFID scanner. The RFID scanner scans for the presence of an RFID tag. When the mobile computing device 105 comes within certain proximity of the internetworking device's RFID tag, the sensor unit 118 receives the electronic code for the particular internetworking device. The sensor unit 118 then sends the unique device identifier received to the system controller 110 for location determination and for retrieving device related information.

In an embodiment the use of an RFID interior positioning system, to determine the position of the mobile computing device 105 may be pinpointed by using multiple RFID tags. In this case, RFID tags may be affixed to pillars in the datacenter as well as the internetworking devices themselves. If the sensor unit 118 of the mobile computing device 105 detects a particular RFID tag affixed to a pillar and the internetworking devices in a rack adjacent to the pillar, but not internetworking devices further down the row; then the system controller 110 may determine that the mobile computing device 105 is within close proximity to the rack adjacent to the pillar only and may present device related information for internetworking devices within the rack adjacent to the pillar.

In an embodiment, both active and passive RFID tags may be used. Passive RFID tags do not require a power source and are powered by the RFID scanner when the RFID scanner comes into close proximity. Passive RFID tags may be used on objects that are not readily moved such as, server racks, pillars, and other internetworking devices that are not frequently moved. Active RFID tags may use a portable power source such as a battery and may be used on internetworking devices that may be relocated or replaced by different equipment. In an embodiment, if an active RFID tag for a particular internetworking device is recognized in a different area, then the system controller 110 may update the location of the particular internetworking device in the device location data model by sending an location update command to the data model manager 101.

Other embodiments may implement interior positioning systems using Cisco's Mobility Services Engine (MSE), where tracking the mobile computing device 105 is accomplished using a hybrid of Wi-Fi signal strengths and RFID tags. The RFID tag may be used to determine the presence of the mobile computing device 105 within a certain area and the Wi-Fi strength signal may be used for proximity determination.

3.2 Presenting Device Related Information to a Mobile Computing Device

In an embodiment, the system controller 110 presents device related information to the computer display unit 115, which then augments the current view of the computer display unit 115 with superimposed computer generated graphics representing the internetworking device related information.

Figure 3:
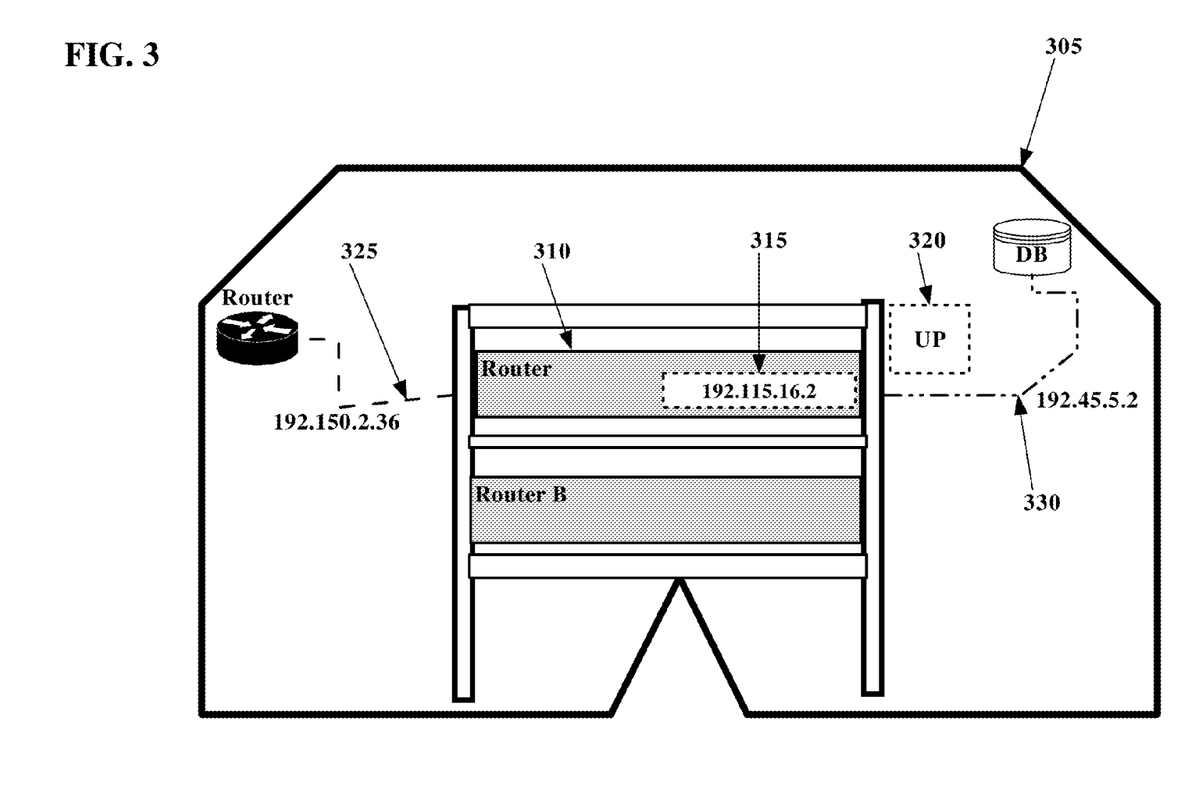
FIG. 3 illustrates an embodiment of presenting internetworking device related information in an augmented reality format.

In an embodiment, the mobile computing device 105 receives device related information which correlates to the internetworking device within the proximity of the mobile computing device 105. The device related information is then superimposed onto the internetworking device itself. FIG. 3 depicts an example of superimposing router related information into augmented reality glasses that represent the mobile computing device 105. When the user of the mobile computing device 105 looks at a router, within a router rack, device related information for that particular router is superimposed onto the router itself. FIG. 3 depicts the superimposed device related information using dotted and dashed lines and dotted squares. Viewpoint 305 is the view through the mobile computing device 105 (augmented reality glasses). The router 310 is the internetworking device that has closest proximity to the augmented reality glasses, and its device related information is superimposed onto it. The augmented IP address 315 is superimposed onto the face of the router 310. Augmented state information 320 may represent whether the router 310 is currently up or down. In this instance the augmented state information 320 is represented by a highlighted "UP" caption box signifying that the router 310 is up and running. Other embodiments of state information may highlight a portion of the internetworking device or the entire networking device a certain color. For example, if the router is highlighted green then the router is up; or if the router is highlighted red then the router is down. The augmented physical connection 325 may highlight a path to another connected router and display the connected router IP address. Augmented logical connections 330 may highlight logical connections between the router 310 and other devices while displaying their IP addresses or other identifiers.

Embodiments may use a combination of colors to present real time data flows where each color may represent whether or not data packets are currently being sent or received. In one embodiment, the real time data flow may change when the user of the mobile computing device 105 physically unplugs a cable from the router 310. In this instance, the superimposed device related information may highlight the disconnected link as well as highlight the newly re-routed physical connection through a backup router. The augmented reality display, in this case may then show a different augmented physical connection 325, with a different IP address to a different now active backup router.

In an embodiment, the superimposed router related information may include a tooltip adjacent to the particular internetworking device displaying interactive options to the user. The user may interact with the tooltip either through the mobile computing device 105 or another computing device to choose one of the displayed options. An embodiment of a displayed interactive option may include performing a traceroute command from the current internetworking device to another connected internetworking device. A traceroute command is a diagnostic tool for displaying the route path through successive nodes from a start point to an end point. In this scenario, the superimposed device related information may highlight the route path and the successive nodes used to reach the end point. As discussed previously, if the user alters the current highlighted route path, then the augmented display will be changed to highlight the new route path.

Another embodiment of interactive commands may include a request from the user to locate a particular internetworking device within the datacenter. In this scenario, the system controller 110 first determines the location of the mobile computing device 105. The location is determined by the last internetworking device scanned by the mobile computing device 105. The system controller 110 then determines an efficient route to the target internetworking device and superimposes a highlighted path using a series of waypoints for the user to follow. In an embodiment the waypoint may be designated by tags located on pillars within the datacenter. Other embodiments may designate waypoints using the tagged internetworking devices themselves. While the user, wearing the mobile computing device 105, follows the highlighted path, the system controller 110 updates the location of the mobile computing device 105 and updates the highlighted path and the series of waypoints.

Other embodiments of an interactive command may include a request from the user to highlight particular routing protocols within the entire datacenter. For instance, the user may request to highlight the Open Shortest Path First (OSPF) routing protocol path routes related to certain internetworking devices. In an embodiment, the user of the mobile computing device 105 may request to send test traffic through the highlighted routing protocol path route in order to determine whether or not faults exist.

In an embodiment, the level of detail augmented onto a mobile computing device 105 may by modified depending on the physical distance between the internetworking device and the mobile computing device 105. For instance, if the mobile computing device 105 is several feet away from the internetworking device then the augmented device information may be limited to only basic information such as state information or an IP address. When the mobile computing device 105 moves closer to the internetworking device, the internetworking device becomes larger on the display screen of the mobile computing device 105. This allows more device related information to be augmented onto the display.

The above embodiments discuss presentation and display of datacenter related devices and their corresponding related information. However, other embodiments of augmented data point information may include many other elements including, but not limited to, sensors tracking the flow of plumbing, air ducts, power lines, and even temperature sensors. Embodiments may display within the augmented reality context of the mobile computing device 105 any data monitored by such sensors.

3.3 Generating and Updating the Device Location Data Model of the Datacenter

In an embodiment, the mobile computing device 105 may be used to update, add, or remove particular internetworking devices and their corresponding geo-location from the device location data model and device repository 120 respectively.

In an embodiment, the mobile computing device 105 may be configured to compile device location information for a plurality of internetworking devices to create a location map of the datacenter. The created location map would then be loaded into the device location data model. Initial creation of the location map may require prior deployment of interior positioning tags within the datacenter so that initial geo-location information of the mobile computing device 105 may be determined. Once the initial geo-location of the mobile computing device 105 is determined, the mobile computing device 105 may be used to scan internetworking devices and relay their relative position back to the system controller 110. The system controller 110 may then send the location information to the data model manager 101 for device location data model population.

In an embodiment where a particular internetworking device is relocated, the user may choose an option where the mobile computing device 105 may update the geo-location of the particular internetworking device after it has been relocated. In this scenario, the system controller 110 would use the last known geo-location of the mobile computing device 105 to determine the new location of the particular internetworking device after it has been scanned by the mobile computing device 105. The system controller 110 would then request the data model manager 101 to update the data model accordingly. Similarly, when new internetworking devices are added to the datacenter, the last known geo-location of the mobile computing device 105 is used to determine the new location of the new internetworking device. In an embodiment, the mobile computing device 105 may have options to remove internetworking devices from the device location data model once they are within close proximity. The removal feature would be useful when decommissioning devices from the datacenter.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
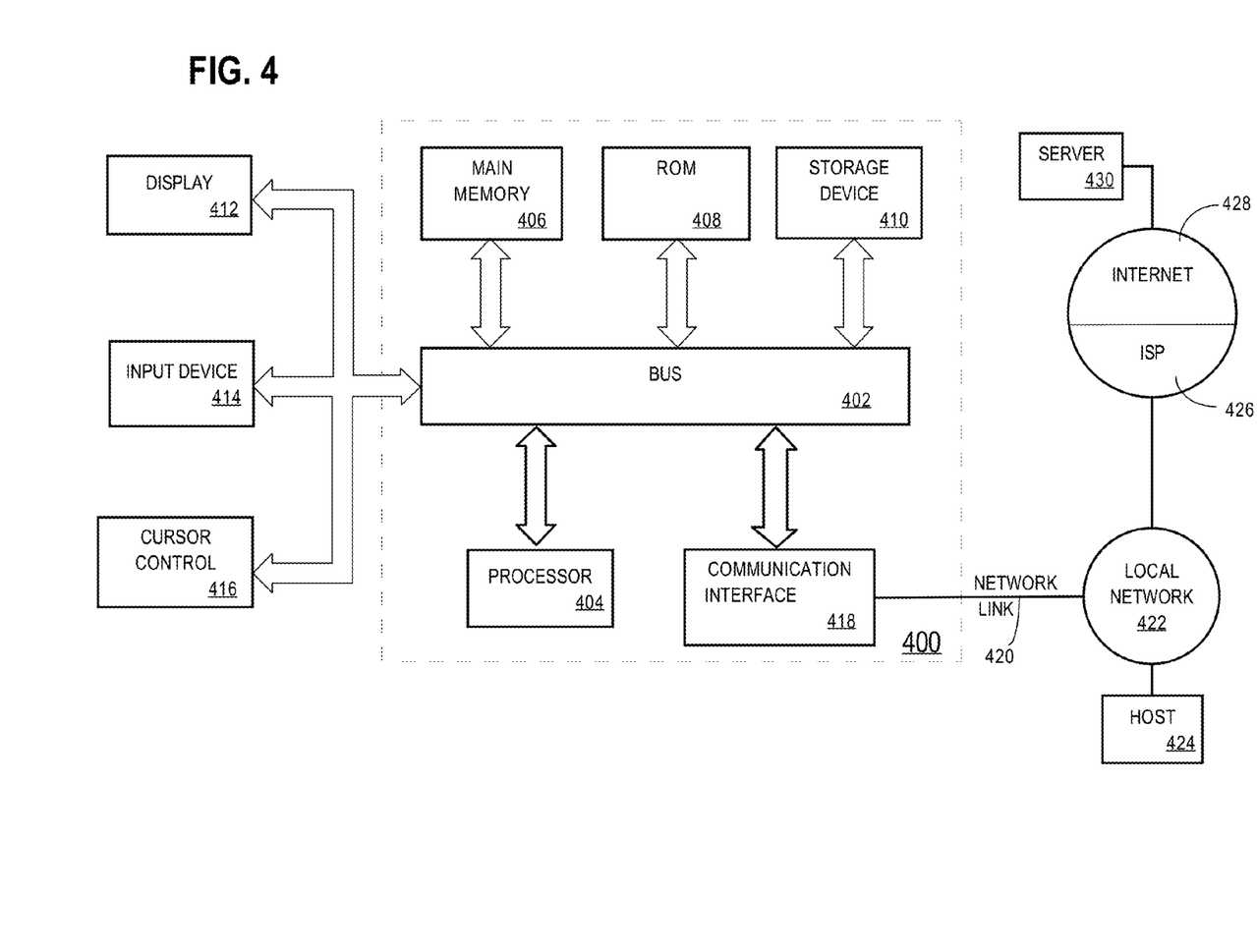
FIG. 4 illustrates a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method of presenting computer datacenter related information, comprising:
   in a server computer system that is coupled to a plurality of internetworking devices that are devices, each configured to emit device location information a unique device identifier receiving the device location proximity information from one or more internetworking devices a mobile computing device, wherein the device location proximity information that is received is based on comprises unique device identifiers received from one or more internetworking devices, of the plurality of internetworking devices, by the mobile computing device and a particular proximity between the mobile computing device and the one or more internetworking devices:
   using the server computer system, determining a geo-location and proximity of the mobile computing device to the one or more internetworking devices based on the proximity information received from the mobile computing device:
   using the server computer system, selecting device related information for a particular internetworking device, of the one or more internetworking devices, that has a closest proximity to the geo-location of the mobile computing device;
   using the server computer system, modifying a level of detail of the device related information based upon the proximity of the mobile computing device and the particular internetworking device;
   using the server computer system, presenting the device related information, for the particular internetworking device, to the mobile computing device;
   reading a unique device identifier of the particular internetworking device using an interior positioning system device of that particular internetworking device;
   determining a device geo-location of the particular internetworking device based upon mapping the device identifier to a device location data model; and
   presenting only the one or more real time data flows that have been obtained from the particular internetworking device that has the closest proximity to the mobile computing device based upon the geo-location of the mobile computing device and the device geo-location of the particular internetworking device.

2. The method of claim 1 wherein the device related information includes one or more real time data flows obtained from the particular internetworking device.

3. The method of claim 2 further comprising updating the one or more real time data flows in response to an interaction of the mobile computing device with the internetworking device that causes a change in the one or more real time data flows.

4. The method of claim 1 further comprising presenting the device related information is in an augmented reality format on the mobile computing device.

5. The method of claim 4 wherein the mobile computing device is a wearable computing device.

6. The method of claim 4 wherein the mobile computing device comprises a mobile computer coupled to a computer display device affixed to an eyeglass frame.

7. The method of claim 1 further comprising:
   in response to detecting a movement of the particular internetworking device, receiving updated device location information from the particular internetworking device; and
   updating a particular geo-location of the particular internetworking device on a device location data model using the updated device location information.

8. The method of claim 1 further comprising:
   in response to detecting one or more new internetworking devices, receiving device location information from the one or more new internetworking devices;
   compiling device location information for the one or more new internetworking devices to create a device location data model of the computer datacenter; and
   updating the device location data model of the computer datacenter by mapping, onto the device location data model of the computer datacenter, one or more locations of the one or more new internetworking devices.

9. The method of claim 1 further comprising:
   receiving a request for location information for a target internetworking device; and
   presenting waypoint information related to the location of the target internetworking device as part of presenting the device related information.

10. The method of claim 9 wherein presenting the waypoint information includes causing displaying a highlighted path from a first location of the mobile computing device to a second location of the target internetworking device.

11. The method of claim 1 wherein presenting the device related information further comprises aggregating device related information from one or more data repositories and presenting the device related information after aggregation.

12. A datacenter management computer comprising:
   a computing network that is configured to couple to a plurality of internetworking devices that are devices, each configured to emit device related information a unique device identifier;

receiving logic in the computing network that is configured to receive device location proximity information from one or more internetworking devices a mobile computing device wherein the device location proximity information that is received is based on comprises unique device identifiers received from one or more internetworking devices, of the plurality of internetworking devices, by the mobile computing device and a particular proximity between the mobile computing device and the one or more internetworking devices; a datacenter management computing unit that is configured to: determine a geo-location and proximity of the mobile computing device to the one or more internetworking devices based on the proximity information received from the mobile computing device;

select device related information for a particular internetworking device, of the one or more internetworking devices, that has a closest proximity to the geo-location of the mobile computing device;

modify a level of detail of the device related information based upon the proximity of the mobile computing device and the particular internetworking device;

present the device related information, for the particular internetworking device, to the mobile computing device;

read a unique device identifier of the particular internetworking device using an interior positioning system device of that particular internetworking device;

determine a device geo-location of the particular internetworking device based upon mapping the device identifier to a device location data model; and present only the one or more real time data flows that have been obtained from the particular internetworking device that has the closest proximity to the mobile computing device based upon the geo-location of the mobile computing device and the device geo-location of the particular internetworking device.

13. The datacenter management computer of claim 12, wherein the device related information includes one or more real time data flows obtained from the particular internetworking device.

14. The datacenter management computer of claim 13, wherein the datacenter management computing unit is further configured to:

update the one or more real time data flows in response to an interaction of the mobile computing device with the internetworking device that causes a change in the one or more real time data flows.

15. The datacenter management computer of claim 12, wherein the datacenter management computing that is configured to present the device related information is in an augmented reality format on the mobile computing device.

16. The datacenter management computer of claim 15, wherein the mobile computing device is a wearable computing device.

17. The datacenter management computer of claim 15, wherein the mobile computing device comprises a mobile computer coupled to a computer display device affixed to an eyeglass frame.

18. The datacenter management computer of claim 12, wherein the datacenter management computing unit is further configured to:

in response to detecting a movement of the particular internetworking device, receive updated device location information from the particular internetworking device; and update a particular location of the particular internetworking device on a device location data model of the computer datacenter using the updated device location information.

* * * * *